(12) United States Patent
Chen et al.

(10) Patent No.: US 6,269,829 B1
(45) Date of Patent: Aug. 7, 2001

(54) INTEGRATED GAS METER

(75) Inventors: Chien-An Chen; Tzong-Sheng Lee; Ching-Yi Wu, all of Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 09/672,997

(22) Filed: Sep. 29, 2000

(51) Int. Cl.⁷ ............................................. G05B 1/00
(52) U.S. Cl. ................................... 137/38; 137/78.4
(58) Field of Search .................................. 137/38, 78.4

(56) References Cited

U.S. PATENT DOCUMENTS

| | | | |
|---|---|---|---|
| 4,787,410 | * 11/1988 | Fujieda et al. | 137/78.4 |
| 5,837,951 | * 11/1998 | Kato et al. | 200/61.45 R |
| 5,908,980 | * 6/1999 | Hwang et al. | 73/40 |

* cited by examiner

Primary Examiner—A. Michael Chambers
Assistant Examiner—Thomas L. McShane
(74) Attorney, Agent, or Firm—Bacon & Thomas, PLLC

(57) ABSTRACT

An adapter to convert a traditional gas meter into a computerized gas meter is disclosed. The adapter of this invention comprises a microcomputer gas flow signal converting module, a gas flow monitoring module, a gas pressure monitoring module, an earthquake sensing module and a gas supply shutoff mechanism, and a casing to enclose the modules and to affixed to said traditional gas meter. The microcomputer gas flow rate signal converting module senses the movement of diaphragm of the traditional gas meter and converts the gas flow rate into computerized signals. The gas flow monitoring module and the gas pressure monitoring module monitor the gas flow rate and the gas pressure, and generate warning signals when abnormal phenomena are sensed. The earthquake sensing module senses strong earthquakes according to vertical vibration waves and horizontal vibration waves of said earthquake. The gas supply shutoff mechanism stops movements of diaphragm in order to stop gas supply when a warning signal is generated by said gas flow monitoring module, said gas pressure monitoring module or said earthquake sensing module.

4 Claims, 1 Drawing Sheet

INTEGRATED GAS METER

FIELD OF INVENTION

The present invention relates to an integrated gas meter, especially to an adapter for gas meter with which a diaphragm gas meter may be upgraded into a microcomputer controlled gas meter without the need of changing any mechanical structure thereof.

BACKGROUND OF INVENTION

The gas meter commonly used in the family is so-called "diaphragm gas meter" which comprises a measuring chamber, a valve element control chamber and a gas flow calculation and output device.

In the diaphragm gas meter, the measuring chamber may be divided into 4 measuring divisions. They are: inner-front division, inner-rear division, outer-front division and outer-rear division. Between the inner divisions and the outer divisions there is provided a moveable diaphragm. Two valves are provided at the entrance and the exit of the measuring chamber separately. By controlling the operation of the valves, gas may enter into the measuring chamber from the entrance and leave the chamber from the exit for further application. Measurement of the gas flow is based on the frequency of movement of the diaphragm. When the diaphragm moves, the position of a level which connects the diaphragm and the valve will change accordingly. As a result, the position of the valve will also change accordingly and the direction of gas flow will be changed. This change causes the diaphragm to move into the other direction. Under the above-said operation, a back-and-forth movement of the diaphragm will take place and the frequency of such back-and-forth movement is sensed, recorded and used to calculate the gas flow rate.

While the safety requirement and the automatic meter reading functions of the gas meter have become more and more important to users of gas meters, microcomputer-controlled gas meters have been developed and supplied to many users. In the microcomputer controlled gas meter, a safety control and communication module is provided about the valve element control chamber.

The measurement of gas flow in the microcomputer controlled gas meter is conducted by a microcomputer controller chip. A position detector is used to convert the frequency of movement of the diaphragm into electronic signals. The signals are then output to the microcomputer controller and the flow rate and the accumulated flow amount are calculated. The microcomputer controller may further provide functions such as safety control. Such safety control may be supported by a pressure sensor and an earthquake sensing element, both provided in the gas meter. The signals of gas pressure and earthquake sensing are transmitted into the microcomputer controller. When abnormal gas pressure or strong earthquake is sensed, the microcomputer controller ignites a shut-down valve to shut down the gas supplied to the gas meter, so to avoid any gas accident. The consumed amount of the gas flow and other safety monitoring information of gas supply may also be provided to a control center through a communication interface, such that reading and safety control of the gas meter may be conducted from a control center.

Due to its convenience, the microcomputer controlled gas meter has been well accepted by many families. However, for those users who has been already installed with conventional gas meters, it is necessary to replace these gas meters with microcomputer controlled gas meters. In order to save replacing costs, some additional modules and adapters have been disclosed. These adapters are so designed that conventional gas meters may be easily upgraded into microcomputer controlled gas meters, without the need of replacing the total gas meter.

U.S. Pat. No. 4,848,148 (assigned issued to American Meter Company) related to a method for the measurement of gas flow rate by counting the back-and-forth movement of the diaphragm inside the gas meter wherein the movement of the diaphragm is sensed by a sensing element. In this invention, the sensing element is a Hall IC device which can sense the movement of the diaphragm. The advantage of this invention rests in that the sensing element of this invention can be attached to the outer cover of the measuring chamber without changing the mechanical structure of the gas meter.

U.S. Pat. No. 5,369,598 (issued to Matsushita Electric Industrial Co., Ltd.) disclosed a method for the conversion of velocity and signals and the safety control of the gas flow rate. In this invention, a round turntable was provided inside the gas meter. The turntable rotates along with the gas flow and the magnets around the turntable passes a magnetic sensing device in sequence. The flow rate of the gas flow is thus calculated by counting the magnets passing the magnetic sensing device within a time unit. The major disadvantage of this invention is that an additional turntable shall be added into the gas meter and change the structure.

As to the modules of the computerized gas meter, several improvements were disclosed:

1. Earthquake Sensing Module

U.S. Pat. No. 5,408,457 (assigned to Osaka Gas Co., Ltd. and Kansai Gas Meter Co., Ltd.) disclosed an earthquake sensor for use inside a gas meter. The earth quake sensor is capable to sense strong earthquakes and comprises a steel ball hung inside a space surrounded by a continuous wall. When an earthquake takes place, the movement of the steel ball will cause a series of ON and OFF signals generated by an switch circuit located about the steel ball. This ON/OFF signals pattern may be used to determine the existence of an earthquake. The advantage of this design is that such earthquake sensor is simple and consumes very little electric power. Its disadvantage, on the other hand, is that it is not capable to measure the magnitude of an earthquake correctly. As a result, it is necessary to provide an additional logic circuit to determine whether a warning signal should be generated.

Japan Patent Publication No. 07-02048 disclosed an earthquake magnitude determination logic applicable to said U.S. Pat. No. 5,408,457. The determination logic of this patent includes a logic look up table wherein values of features of an earthquake such as total period of earthquake, number of cycles of shakes and time of shaking cycles are taking as factors. The advantage of this patent is that the look up table may be used to design the control circuit. Its disadvantage, however, is that the truth table is not applicable to areas where patterns of earthquake are different.

In addition to the above, in Douglas P. Ardunini's article "Smart Sensor Requirements for Second Generation Seismic Gas Shut-Off Valves" and in John Andrew Miche's U.S. Pat. No. 5,742,235, some features of earthquake were disclosed. According to their analysis, in an earthquake, its vertical waves (p-waves) will have a higher transmission speed than that of the horizontal waves (s-waves). On the other hand, the magnitude and the destroying power of the vertical wave are far smaller than that of the horizontal waves. As a result, in said U.S. Pat. No. 5,742,235, a micro vibration switch made from a semiconductor manufacture process was invented to sense the vertical waves of an earthquake. The advantage of this invention is that the structure of this earthquake sensor is simple and that its manufacture cost is relatively low. However, according to another analysis of the features of earthquakes, the magnitude of the vertical waves of an earthquake is very tiny (about 0.01 g). Under such a tiny scale, errors in the determination of an earthquake are easily caused, if only the vertical waves are sensed and are used as the only basis of the determination.

2. Pressure Sensing Module

In the computerized gas meter, its pressure sensor comprises a pressure switch using a diaphragm. The measuring area of gas pressure locates inside the valve element control chamber. Measurement of the gas pressure is conducted at the entrance of the gas meter. The advantage of this patent is the pressure switch consumes no electric power while it stands by. Its disadvantage, on the other hand, is that the diaphragm pressure switch has a certain volume. When it is inserted to the gas meter, it is necessary to modify the mechanical structure of the gas meter. Another problem is that the hysteresis phenomenon of the diaphragm pressure switch is obvious than that of general pressure gauges.

3. Gas Flow Shut-Down Mechanism

The most important feature of a microcomputer controlled gas meter is that it has a gas flow shut down mechanism. U.S. Pat. No. 5,408,457 (assigned to BLP Components Limited) disclosed an electric-magnetic valve to be used inside the gas meter. In this patent, a keep type solenoid is provided to push a valve so to shut down the gas flow. The advantage of this patent is that the control circuit is easy to design and that the gas flow may be shut down effectively. Its disadvantage is that, while the electric-magnetic valve is used, it is necessary to keep the balance between the volume of the valve seat and the resistance of the gas flow. Such requirement will make the design of the device difficult. In addition, if the shut-sown device shall be positioned inside the gas meter, due to the design of the valve seat, it is necessary to change the mechanical structure of the gas meter in a great scale.

4. Adapter the adapter is a necessary device that enables the microcomputer control module to be adapted to a conventional gas meter so to upgrade the gas meter into a microcomputer controlled gas meter. Japanese patent NO. 8210893 (issued to Kokyo Gas Co., Ltd. And Kimmon Mfg Co., Ltd.) disclosed an adapter for the microcomputer controlled gas meter. In this patent the microcomputer control module was adapted to the conventional gas meter at the latter's front side, not on its top side. This design enables the computerized gas meter to reduce its height. However, similar to some of the above-mentioned prior art, while a pressure sensor and a shut-down valve shall be installed inside the gas meter, it is necessary to change the mechanical structure of the gas meter as well.

OBJECTIVES OF THE INVENTION

The objective of this invention is to provide a novel integrated computerized gas meter.

Another objective of this invention is to provide an adapter for computerized gas meter so that a conventional gas meter may be upgraded into a computerized gas meter without the need of changing its mechanical structure.

Another objective of this invention is to provide an assembled computerized gas meter comprising a conventional gas meter.

Another objective of this invention is to provide a microcomputer controlled gas meter with integrated functions.

BRIEF DESCRIPTION OF THE INVENTION

According to the present invention, an adapter to convert a conventional gas meter into a computerized gas meter is provided. The adapter of this invention comprises a microcomputer gas flow signal converting module, a gas flow monitoring module, a gas pressure monitoring module, an earthquake sensing module and a gas supply shutoff mechanism, and a casing to enclose the modules and to affixed to said conventional gas meter. The gas flow rate signal converting module senses the movement of diaphragm of the traditional gas meter and converts the gas flow rate into computerized signals. The gas flow monitoring module and the gas pressure monitoring module monitor the gas flow rate and the gas pressure, and generate warning signals when abnormal phenomena are sensed. The earthquake sensing module sense strong earthquakes according to vertical vibration waves and horizontal vibration waves of said earthquake. The gas supply shutoff mechanism stops movements of diaphragm in order to stop gas supply when a warning signal is generated by said gas flow monitoring module, said gas pressure monitoring module or said earthquake sensing module.

These and other objectives and advantages of this invention may be clearly understood from the detailed description by referring to the following drawing.

DETAILED DESCRIPTION OF THE INVENTION

Figure 1:
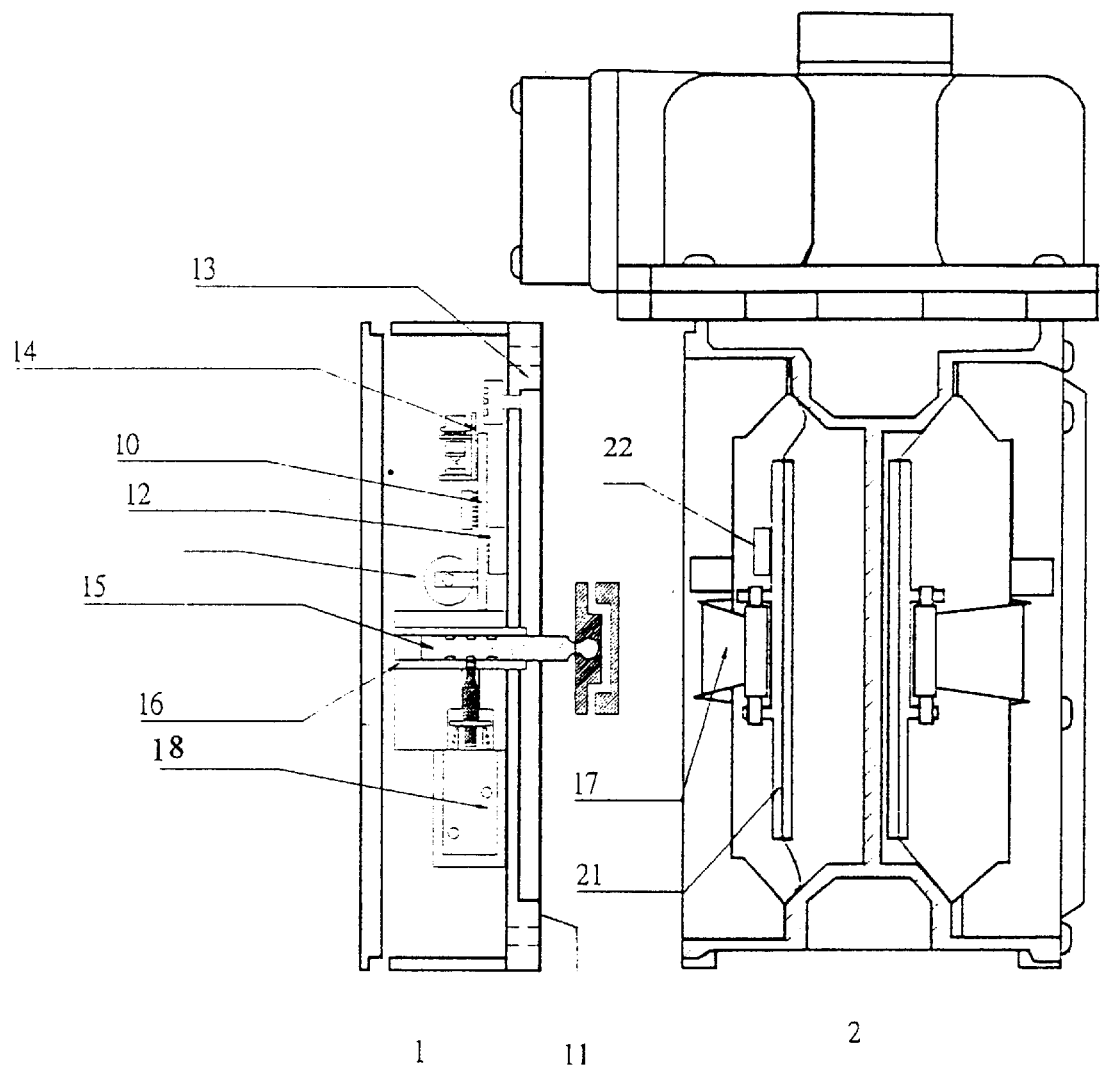
FIG. 1 illustrates the system diagram of the integrated gas meter of this invention.

FIG. 1 illustrated the system diagram of the integrated gas meter of this invention. As shown in this figure, the integrated gas meter of this invention comprises: a gas meter 2 and an adapter 1, in which the gas meter provides basic functions such as gas flow control and measurement and the adapter 1 provides gas flow signal reading function, gas supply shutoff function, safety control function, reading communication function etc.

The spirit of this invention rests in the adapter for computerized gas meter 1. The following is a detailed description of the modules of the adapter, taking the Aichi N3 gas meter (manufactured by Aichi Tokei Denki Co. LTD Co, Japan, hereinafter referred to as the "original gas meter") as the gas meter to be adapted with the adapter of this invention for example.

1. Casing

As shown in FIG. 1, adapter for microcomputer controlled gas meter 1 of this invention is a front adapter which replaces the front cover of the original gas meter 2. As a result, the total height of the gas meter 2 will not be changed. At the same time, the main structure of the original gas meter 2 needs not be changed to adapt to the adapter 1 of this invention, in order to be upgraded to a microcomputer controlled gas meter.

The adapter for microcomputer controlled gas meter 1 of this invention comprises a casing 11 to enclose the modules of the adapter and to replace the front cover of the original gas meter 2. When the adapter 1 is installed to the original gas meter 2, the front cover (not shown) of the gas meter 2 is removed and the adapter is then fixed to the gas meter 2 with conventional way of fixation.

2. Signal Conversion For Gas Flow And Gas Flow Monitoring

It is already known from the previous study that the gas flow rate is in ratio to the cycle of movement of the diaphragm 21 inside the measurement chamber. In the integrated gas meter of this invention, a magnet 22 is attached to the membrane 21 and a reed switch 12 is affixed to its corresponding position at inside the casing of the adapter 1. When the gas flows, the diaphragm 21 will move back and forth, such that the magnet 22 moves back and forth along with the diaphragm 21. The reed switch 12 at the casing of the adapter 1 will sense the movement of the diaphragm 21 and output ON-OFF signals representing the movement of the diaphragm 21, and the flow rate of the gas.

The signals representing the flow rate of the gas generated by the reed switch 12 is then processed by the microcomputer control circuit 10 in the adapter 1, such that the flow rate of the gas may be calculated and any abnormal phenomenon may be easily monitored.

The monitoring of the gas flow includes monitoring of maximum gas flow rate and monitoring of respective gas consuming appliances. In the monitoring of maximum gas flow rate, a threshold is predetermined. When the gas flow rate is greater than the threshold, a warning signal will be generated by the control circuit 10 to indicate an abnormal flow rate of gas. As to the monitoring of respective gas consuming appliances, an algorithm that records the variation of gas consume to analysis the average gas consume of respective appliances. When gas consume of a particular appliance exceeds the safe gas consuming quantity, a warning signal is generated by the control circuit 10 to indicate abnormal gas consume of that appliance.

3. Monitoring Of Gas Pressure

It is already known from the previous study and the relative safety regulations that the gas pressure at the entrance of the gas meter shall be about 170 mm $H_2O$ and the gas pressure drop at the operational area of the gas meter shall be under 20 mm $H_2O$. As a result, under normal supply and operation conditions, the gas pressure inside the measurement chamber shall be maintained at about 150–170 mm $H_2O$.

In the adapter 1 of this invention, a semiconductor micro pressure sensor 13 is affixed to the internal of the casing, adjacent to the measurement chamber. The signal generated by the micro pressure sensor 13 is transmitted to the microcomputer control circuit 10 such that the pressure inside the measurement chamber is monitored. When a leakage of gas supplied to the gas meter takes place, the pressure of the gas will drop. The abnormal gas pressure will be sensed by the micro pressure sensor 13 and the control circuit 10 will generate a warning signal or shutoff the gas supply (to be described hereinafter) to avoid any accident.

4. Monitoring of Earthquake

An earthquake sensor 14 is provided in the adapter for microcomputer controlled gas meter 1 of this invention to avoid indirect damage caused by the earthquake. The earthquake sensor 14 may be any earthquake sensing device. The earthquake sensing device of U.S. patent application Ser. No. (to be supllied later) may be taken for reference in this invention.

It is known from the previous study that, when an earthquake takes place, its vertical wave will be sensed first and that the magnitude of the vertical wave is far smaller than that of the horizontal wave. In the earthquake sensor 14 of this invention, a micro vibration switch (not shown) is provided to sense the vertical waves of the earthquake and a horizontal vibration wave sensing device is provided to sense the horizontal waves of the earthquake. When both the vertical waves and the horizontal waves are sensed, a warning signal will be generated by the control circuit 10 to indicate the happening of an earthquake. Since the horizontal waves of an earthquake is taken for consideration, it is possible to avoid errors in the determination of an earthquake.

5. Gas Supply Shutoff Mechanism

It is known from the previous study that gas flowing into the gas meter will drive the membrane to move and that the movement of the membrane may be used to control the movement of the valve at the entrance of the measurement chamber, through the transmission of forces with a flag rod coupling with a valve rod. The gas supply shutoff mechanism of this invention provides a braking mechanism to the membrane such that the gas supply will be shutoff when the movement of the diaphragm 21 is stopped.

As shown in FIG. 1, the shutoff mechanism of this invention is quite different from that used in the conventional gas meter. The gas flow supply shutoff mechanism of tis invention comprises a keep-type solenoid 14, a slide level 15, a slide seat 16 and a connection member 17. Through the design of the connection member 17, the movement of the diaphragm 21 is coupled with the slide level 15. On the other hand, the back and forth movement of the solenoid 14 is used to stop the movement of the slide level 15 so to stop the movement of the diaphragm 21. When the movement of the diaphragm 21 is stopped, the valve (not shown) at the entrance of the measurement chamber is stopped. As a result, gas supply to the gas meter is shutoff, i.e., the gas supply is stopped.

The shutoff operation of the gas supply shutoff mechanism is started by the microcomputer controlled circuit 10, when a warning signal of abnormal gas supply, abnormal gas pressure drop or a strong earthquake is generated, so to avoid possible damages.

6. Reading Communication Module

Besides the safety monitoring and control functions, the adapter for microcomputer controlled gas meter also provides a reading communication function. A communication interface is provided such that readings or other information may be transmitted to an external equipment so to facilitate remote control and reading functions. The reading communication module of this invention may provide a wired communication interface of a wireless communication interface, so to facilitate remote control and communication functions.

The structure and circuit of the reading communication module can be easily understood by those skilled in the art and detailed description thereof is thus omitted.

EFFECTS OF THE INVENTION

In comparison with the conventional gas meter, the present invention provided at least the following improvements:

1. In upgrading a conventional gas meter into a microcomputer controlled gas meter, it is not necessary to change the structure or mechanism of the conventional gas meter. Costs in upgrading are thus saved.

2. When the adapter for microcomputer controlled gas meter of this invention is adapted to a conventional gas meter, the total height of the gas meter will not be increased. It is thus not necessary to adjust the application environment of the conventional gas meter. Costs in installation of the adapter are thus saved.

3. The earthquake sensing device of this invention determines an earthquake by taking the horizontal vibration waves for consideration. Errors in determination of earthquakes are thus avoided.

4. The gas supply shutoff mechanism of this invention used different mechanism to stop the gas supply. A compact mechanism of the gas supply shutoff module is thus obtained. As the shutoff mechanism is compact, it is possible to provide further functions based on the shutoff mechanism and it is also possible to change the shape or direction of the components of the shutoff mechanism. Because the gas supply shutoff mechanism of this invention is so designed that the gas supply is stopped by braking the movement of the diaphragm, it is thus not necessary to narrow the entrance of the gas supply channel or to alter the design of the gas supply channel. As a result, the flow resistance of the original gas meter won't be changed or influenced and adjustment or calibration of the gas measurement mechanism is thus net necessary.

As the present invention has been shown and described with reference to preferred embodiments thereof, those skilled in the art will recognize that the above and other changes may be made therein without departing from the spirit and scope of the invention.

What is claimed is:

1. An adapter to convert a traditional gas meter into a computerized gas meter, comprising:

a casing to be affixed to said traditional gas meter to replace a cover of said traditional gas meter;

a microcomputer gas flow rate signal converting module, comprising a diaphragm to be positioned adjacent to entrance of gas of said traditional gas meter and a magnet affixed to diaphragm, a reed switch positioned at a relative position inside said casing to sense movement of said magnet and a converter circuit connected to said reed switch to convert signals generated by said reed switch into gas flow rate signals;

a gas flow monitoring module comprising a flow rate comparison device to generate a warning signal when said gas flow rate is greater than a predetermined value;

a gas pressure monitoring module comprising a pressure meter to measure gas pressure at gas flow measurement chamber of said traditional gas meter and a gas pressure monitoring circuit to generate a warning signal when said gas pressure is lower than a predetermined value;

an earthquake sensing module to sense an earthquake according to vertical vibration waves and horizontal vibration waves of said earthquake and to generate a warning signal when an earthquake is sensed; and a gas supply shutoff mechanism comprising a braking device to stop movements of said gas flow sensing and said diaphragm in order to stop gas supply and a control device to control said braking device to shutoff said gas supply when a warning signal is generated by said gas flow monitoring module, said gas pressure monitoring module or said earthquake sensing module;

wherein said microcomputer gas flow rate signal converting module, said gas flow monitoring module, said gas pressure monitoring module, said earthquake sensing module and said gas supply shutoff mechanism are enclosed in said casing.

2. The adapter according to claim 1, wherein said pressure meter of said gas pressure monitoring module comprises a semiconductor micro pressure meter.

3. The adapter according to claim 1, wherein said earth sensing module comprises a sensor for vertical earthquakes waves and a sensor for horizontal earthquake waves.

4. The adapter according to claim 1, wherein said braking device of said gas supply shutoff mechanism comprises a slide level to push said diaphragm to stp supply of gas and a keek-type solenoid to control movement of said slide level.

* * * * *